(12) United States Patent
Bennett

(10) Patent No.: US 8,899,517 B2
(45) Date of Patent: Dec. 2, 2014

(54) LANDING GEAR

(75) Inventor: Ian Bennett, Gloucestershire (GB)

(73) Assignee: Messier-Dowty Limited (GB)

( * ) Notice: Subject to any disclaimer, the term of this patent is extended or adjusted under 35 U.S.C. 154(b) by 152 days.

(21) Appl. No.: 13/578,404

(22) PCT Filed: Feb. 7, 2011

(86) PCT No.: PCT/GB2011/050204
§ 371 (c)(1),
(2), (4) Date: Aug. 10, 2012

(87) PCT Pub. No.: WO2011/098786
PCT Pub. Date: Aug. 18, 2011

(65) Prior Publication Data
US 2012/0305703 A1  Dec. 6, 2012
US 2013/0186998 A2  Jul. 25, 2013

(30) Foreign Application Priority Data

Feb. 11, 2010 (GB) .................................. 1002322.4

(51) Int. Cl.
*B64C 25/50* (2006.01)
*B64C 25/34* (2006.01)

(52) U.S. Cl.
CPC ................. *B64C 25/50* (2013.01); *B64C 25/34* (2013.01); *B64C 2025/345* (2013.01)
USPC ......................................... 244/50; 244/100 R

(58) Field of Classification Search
USPC ........................ 244/50, 100 R, 102 R–104 LS
See application file for complete search history.

(56) References Cited

U.S. PATENT DOCUMENTS

| | | | |
|---|---|---|---|
| 2,930,547 A * | 3/1960 | Hogan | 244/50 |
| 5,207,398 A * | 5/1993 | Veaux et al. | 244/100 R |
| 8,136,754 B2 | 3/2012 | DeRuffray et al. | |
| 2010/0078517 A1 | 4/2010 | Coles et al. | |

FOREIGN PATENT DOCUMENTS

| | | |
|---|---|---|
| CN | 101208241 | 6/2008 |
| EP | 1958873 | 8/2008 |
| FR | 2802892 | 6/2001 |
| FR | 2812613 | 2/2002 |

OTHER PUBLICATIONS

Podratzky, Andrea, Authorized Officer of the EPO, International Search Report for PCT/GB2011/050204, Jun. 7, 2011.
Office Action (with English translation) for CN201180009265.2 dated May 6, 2014.

* cited by examiner

*Primary Examiner* — Timothy D Collins
*Assistant Examiner* — Richard R Green
(74) *Attorney, Agent, or Firm* — RatnerPrestia

(57) ABSTRACT

A landing gear, including an elongate axle pivotally connected to a bogie beam, the landing gear further including a locking device for locking the axle at a substantially fixed orientation with respect to the bogie beam, the locking device including first and second barrier arms that are movable between a first configuration, in which they define a barrier so as to maintain the maintain the axle in the substantially fixed orientation with respect to the bogie beam, and a second configuration, in which the axle may pivot about the bogie beam.

20 Claims, 3 Drawing Sheets

LANDING GEAR

This application is a U.S. National Phase application of PCT International Application No. PCT/GB2011/050204, filed Feb. 7, 2011, which claims the benefit of GB1002322.4, filed Feb. 11, 2010.

BACKGROUND OF THE INVENTION

Large aircraft are often provided with a number of multi-axle landing gear. For example, such a landing gear may comprise a bogie beam carrying three axles, each axle carrying a plurality of wheels. It is common for one of the axles, generally the rear axle, to be steerable so as to reduce tyre wear when the aircraft is taxiing. The steerable axle is generally pivotally connected to the bogie beam. An actuator provided between the bogie beam and the steerable axle can control the orientation of the axle relative to the bogie beam.

As will be appreciated, there are instances where it is desirable for a steerable axle of a landing gear to be locked in a predetermined orientation. For example, during take-off and landing it is desirable that the steerable axle is locked in an orientation which is generally orthogonal with respect to the bogie beam and parallel with respect to the other axles on the bogie beam. Such landing gears are therefore provided with a locking device for locking the orientation of the steerable axle relative to the bogie beam.

A known way of providing a locking device is to provide a locking actuator. For example, the steering actuator may be configured to lock when it is at a predefined extension state, corresponding to the extension state required to provide the desired locking orientation of the axle.

A further known locking device is to provide a slot extending into the steerable axle in a manner substantially orthogonal with respect to the longitudinal axis of the axle. A wedge may be provided that is movable between a first position where the wedge is housed within the slot, so as to prevent the steerable axle pivoting about the bogie, and a second position where the wedge is removed from the slot, to allow the axle to pivot.

Both the above-mentioned types of locking device suffer from a disadvantage in that they need the steering mechanism to bring the axle to the correct locking orientation before the lock can engage. This can be problematic when the bogie beam bends under static load. As will be appreciated by a person skilled in the art, because the steering actuator is provided between the bogie beam and the steering axle, deflection of the bogie beam can attempt to cause the axle to pivot. This is due to the deflection of the bogie beam causing a change in the straight line distance between the point where the axle connects to the bogie beam and the point where the steering actuator connects to bogie beam. When the lock is released the axle will pivot, and if it moves far enough it may prevent the lock from re-engaging, even though the steering actuator is in its centred position.

Another example when locking can be problematic occurs if an internally locking actuator is powered to a centred position defined by a control system with a follow-up sensor, or by internal differential area, and the lock position does not exactly coincide with this driven position, due to tolerances, such that the internal lock element does not engage with its mating feature.

BRIEF SUMMARY OF THE INVENTION

In accordance with a first aspect of the present invention, there is provided a landing gear for an aircraft, the landing gear including an elongate axle pivotally connected to a bogie beam, the landing gear further including a locking device for locking the axle at a substantially fixed orientation with respect to the bogie beam, the locking device including first and second barrier arms that are movable between a first configuration, in which they define a barrier so as to maintain the axle in the substantially fixed orientation with respect to the bogie beam, and a second configuration, in which the axle may pivot about the bogie beam Thus, the barrier arms can be advanced to a first, deployed, configuration where they each take up a position arranged to maintain the axle in a particular orientation, for example an orthogonal position. In some embodiments, the axle can be moved to the particular orientation by one of the arms as the arm moves towards the first configuration and as such the locking device does not need the steering mechanism to bring the axle to the correct locking orientation before the lock can engage.

The barrier arms may be pivotally mounted with respect to the bogie beam. In such a case, the axis of rotation of each barrier arm may be non-orthogonal with respect to the axis of rotation of the axle. Preferably, the axis of rotation of each barrier arm is generally parallel with respect to the axis of rotation of the axle.

The barrier arms may be provided on longitudinally opposite side of the bogie beam.

The locking device may be arranged to lock the barrier arms in the first configuration.

The locking device may be arranged such that the one of the barrier arms may be moved to and locked in the first configuration, while the other barrier arm is between the second and first configurations.

The locking device may further include a first, two-bar over-centre linkage, arranged to move the first barrier arm between the first and second configurations.

The locking device may further include a second, two-bar over centre linkage, arranged to move the second barrier arm between the first and second configurations.

The locking device may further include an actuator connected at a first end to a middle region of the first two-bar over centre linkage, and at a second end to a middle region of a second two-bar over centre linkage.

The locking device may include a biasing device arranged to bias the barrier arms towards the first configuration.

The barrier arms may each include an arm abutment arranged to engage a corresponding axle abutment when a respective barrier arm is adjacent the axle.

The axle abutments may be defined on opposite sides of the axis of rotation of the axle and spaced from one another.

The barrier arms may be arranged such that the arm abutments move in the plane of movement of the axle abutments.

The locking device may be arranged to be operable to urge the axle to a position generally orthogonal to the bogie beam, from an initial position which may be displaced by more than 3°.

The barrier arms may be spaced further from the axle when in the second configuration, than in the first configuration.

In accordance with a second aspect of the present invention there is provided a landing gear including an elongate axle pivotally connected to a bogie beam, the landing gear further including locking means for locking the axle at a substantially fixed orientation with respect to the bogie beam, the locking means including first and second barrier means that are movable between a first configuration, in which they define a barrier so as to maintain the axle in the substantially fixed orientation with respect to the bogie beam, and a second configuration, in which the axle may pivot about the bogie beam.

These and other aspects of the present invention will be apparent from, and clarified with reference to, the embodiments described herein.

DESCRIPTION OF THE DRAWINGS

Embodiments of the present invention will now be described, by way of example only, with reference to the accompanying drawings, in which.

DETAILED DESCRIPTION OF EMBODIMENTS OF THE INVENTION

Figure 1:
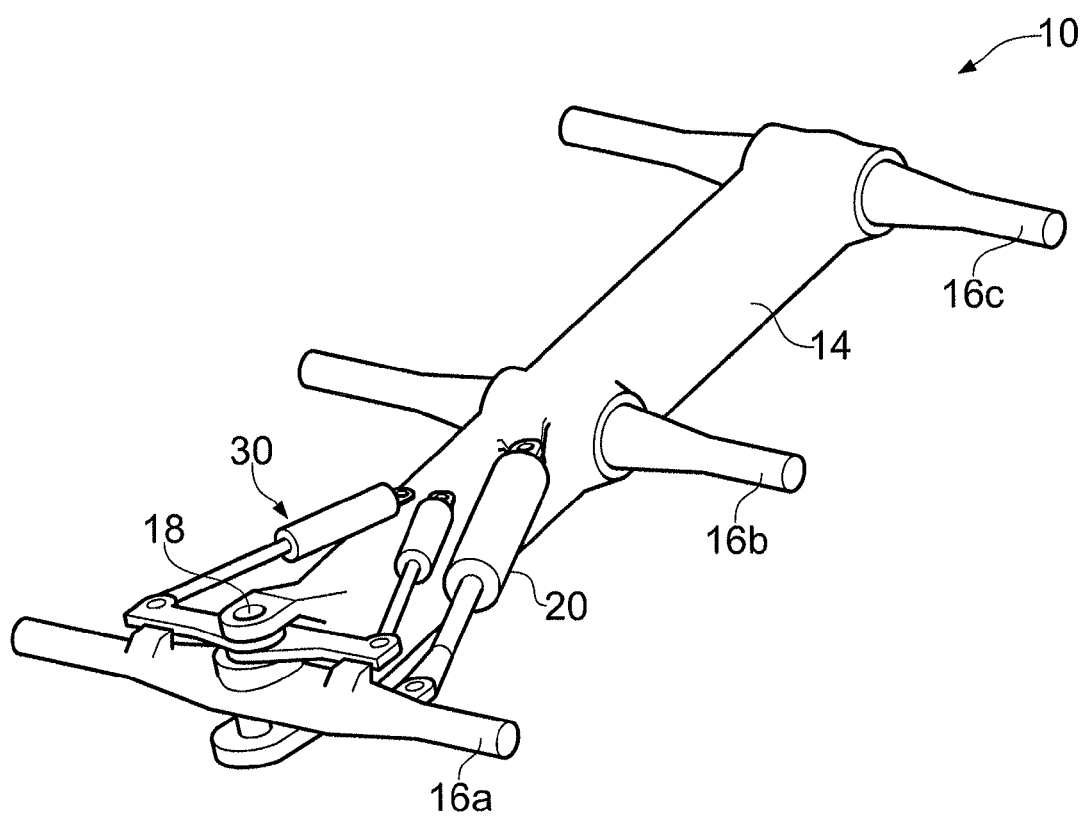
FIG. 1 shows a perspective view of a landing gear for an aircraft, according to an embodiment of the present invention.

Referring to FIG. 1, a perspective view of a landing gear 10 according to an embodiment of the present invention is shown. For clarity, the landing gear 10 has been shown without its wheels, strut, etc.

The landing gear 10 comprises an elongate body in the form of a bogie beam 14 on which are mounted a plurality of axles 16a, 16b, 16c. The front axle 16c and middle axle 16b are generally orthogonal with respect to the bogie beam 14. The rear axle 16a is pivotally connected at a mid region thereof, to an end region of the bogie beam 14 via pivot pin 18. The pivot point thus defines an axis of rotation at its centre point. The rear axle 16a has a mounting region through which the pivot pin 18 passes. The rear axle 16a further includes first and second axle abutments extending longitudinally from respective sides of the mounting region. As will be discussed in more detail below, the landing gear 10 includes a locking device 30 including arm abutments arranged to be brought into contact with the first and second axle abutments of the axle 16a so as to maintain the axle 16a in a desired orientation with respect to the bogie beam 14. A steering actuator 20 is provided between the bogie beam 14 and the axle 16a to control the orientation of the axle 16a relative to the bogie beam 14. However, some embodiments of the present invention may not include a steering actuator 20 and the bogie beam 14 may carry any number of axles.

Figure 2:
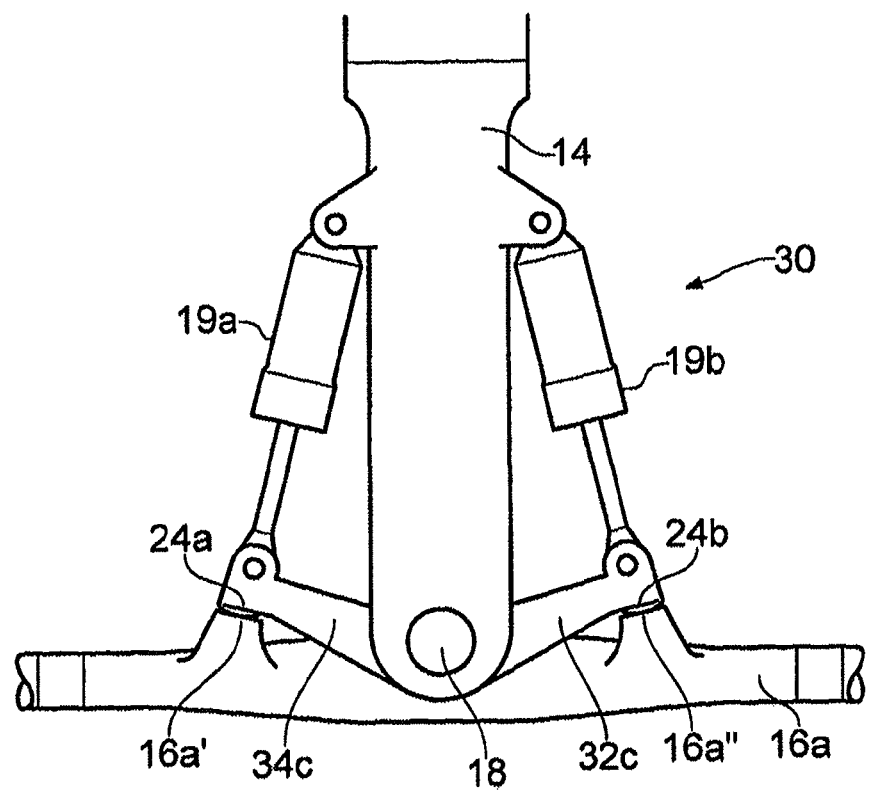
FIG. 2 shows a partial view of the landing gear of FIG. 1 focusing on the locking device thereof.

FIG. 2 shows partial plan view of the landing gear 10 of FIG. 1, focusing on the locking device 30. The locking device 30 is coupled to the bogie beam 14 so as to be supported by it. The locking device 30 in this embodiment comprises a pair of locking arms, also referred to as barrier arms, 32c, 34c pivotally connected to the bogie beam 14 and a pair of actuators 19a, 19b arranged to move the barrier arms 32c, 34c.

The first actuator 19a is pivotally connected at one end to a side region of the bogie beam 14 and pivotally connected at its other end to the first barrier arm 34c. Similarly, the second actuator 19b is pivotally connected at one end to an opposite side region of the bogie beam 14 to that which the first actuator 19a is connected, and pivotally connected at its other end to the second barrier arm 32c. The actuators 19a, 19b are connected to the end regions of the barrier arms 34c, 32c furthest from their axis of rotation.

The barrier arms 32c, 34c are disposed on either side of the bogie beam 14 and may each pivot about their axis of rotation between deployed and retracted configurations. The axis of rotation of each of the barrier arms 32c, 34c is, in this embodiment, coaxial with the axis of rotation of the axle 16a. However, in other embodiments one or both of the barrier arms 32c, 34c may have axis of rotation that are independent from the axis of rotation of the axle 16a and the axis in question may be orientated at any suitable orientation, such as being non-orthogonal with respect to the axis of rotation of the axle 16a. It is preferable that the axis of rotation of a barrier arm 32c, 34c is generally parallel with the axis of rotation of the axle 16a, so that the barrier arm moves in the same or similar movement plane to the axle 16a, such as a generally parallel plane of movement.

Each barrier arm 32c, 34c defines a respective arm abutment 24a and 24b. The arm abutments 24a, 24b may protrude so as to provide a "raised" axle abutment, for engaging with first and second axle abutments 16a', 16a" of the axle 16a. The barrier arms 32a, 34c are arranged such that the arm abutments 24a, 24b can move in at least some of the plane of movement of the first and second axle abutments 16a', 16a" of the axle 16a, such that the arm abutments 24a, 24b can be used to inhibit pivotal movement of the axle 16a. The arm abutments 24a, 24b are arranged such that they can be brought into engagement with corresponding first and second axle abutments 16a', 16a" of the axle 16a to maintain the axle 16a in a locking orientation. As will be appreciated by a person skilled in the art, when it is said that the arm abutments 24a, 24b "engage" with the axle abutments 16a', 16a" when the barrier arms 32a, 34c are in the deployed configuration, in reality a small gap will exist between corresponding abutments to allow for tolerances. However, as will be understood, the arm abutments 24a, 24b can be moved to the deployed configuration where they take up a position that locks the axle 16a in a locking orientation.

The axle abutments 16a', 16a" each face outwards into a relatively large open space, within which the arm abutments 24a, 24b are disposed and arranged to move within. The first and second axle abutments 16a', 16a" of the axle 16a are arranged such that that the smallest angle between a pair of radii, each radii extending from the axis of rotation of the axle and exclusively passing thought a respective one of the axle abutments, is generally 170°. However, in other embodiments the smallest angle may be any suitable angle, such as 60° or more, 90° or more, 120° or more, 150° or more, 180° or more, or 210° or more. It will be appreciated by a skilled person that, generally speaking, a larger angle between the axle abutments results in more space within which movable arm abutments 24a, 24b and other parts of a locking device can operate. The radius from the axis of rotation of the axle 16a to the closest part of one of the first and second axle abutments 16a', 16a" is great enough to provide a reasonable degree of mechanical advantage, such that the force applied to a axle abutment 16a', 16a" in order to move the axle 16a, in use, is within the capability of the chosen locking device 30. In the illustrated example the radius is generally equal to the approximate diameter of the bogie beam. However, the radius may in other embodiments be any suitable distance, such as at least as large as the average diameter of the axle 16a.

The locking device 30 is arranged to move the arm abutments 24a, 24b between a retracted configuration and a deployed configuration. In the retracted configuration, actuators 19a, 19b are in a shortened state such that the arm abutments 14a, 14b are spaced from the axle 16a so as to permit the axle 16a to pivot about the bogie beam within predefined limits.

The locking device 30 is operable to move the first and second arm abutments 24a, 24b from the retracted configuration, to a deployed configuration where the arm abutments 24a, 24b take up a position arranged to maintain the axle 16a in a substantially fixed orientation with respect to the bogie beam 14. In the illustrated embodiment this orientation is substantially orthogonal with respect to the bogie beam 14, however other orientations could be defined by setting appropriate take up positions for the arm abutments 24a, 24b. When in the deployed configuration, the arm abutment 24a inhibits a respective side of the axle 16a pivoting clockwise towards it. Similarly, the arm abutment 24b inhibits the axle 16a pivoting anti-clockwise, so as to maintain and thus lock the axle 16a at a desired orientation with respect to the bogie beam 14. In the illustrated embodiment the locking device 30 is arranged such that the arm abutments 24a, 24b each have a fixed deployment range, set by the extension limit of the actuators 19a, 19b, and the locking device 30 is arranged such that the arm abutments 24a, 24b can be locked in the deployed configuration, for example by way of providing locking actuators.

In the illustrated embodiment the arm abutments 24a, 24b can be moved between the deployed and retracted configurations at different rates to one another and generally independently of one another. This is advantageous because it enables one of the arm abutments 24a to move to the deployed configuration whilst the other arm abutment 24b is, for example, moving towards the deployed configuration against the opposing force provided by the axle 16a, due to the axle 16a being in a non-orthogonal orientation with respect to the bogie beam 14. The arm abutment which has adopted the extended configuration may prevent the axle 16a over-swinging, past the orthogonal orientation, as it is urged towards this configuration by the other arm abutment. The locking device 30 thus may act to "catch" the axle 16a and prevent overswing. However, in other embodiments the locking device may be arranged to drive both barrier arms 32a, 34c at the same time.

Figure 3A:
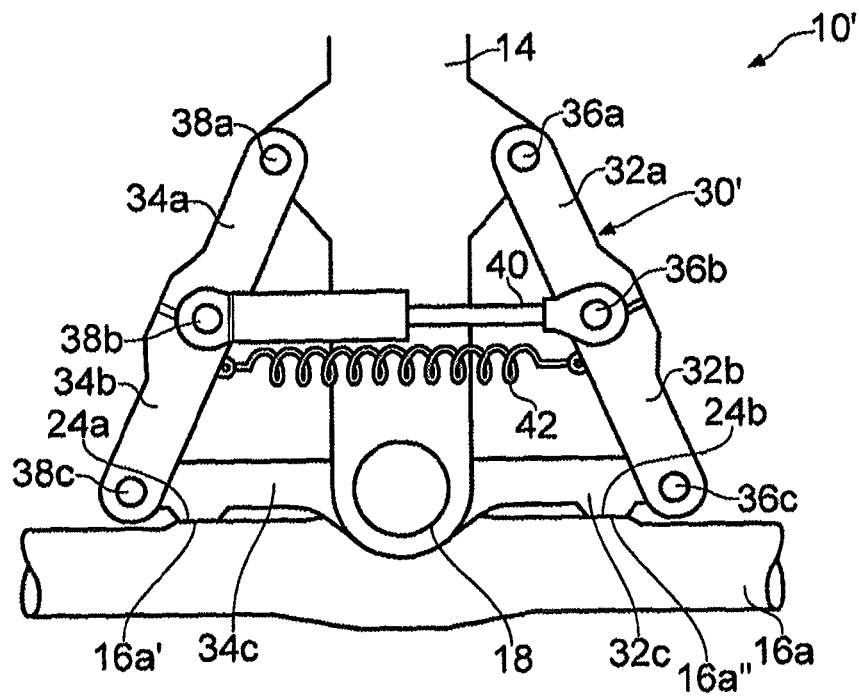
FIGS. 3a and 3b show a landing gear according to a further embodiment of the present invention.
Figure 3B:
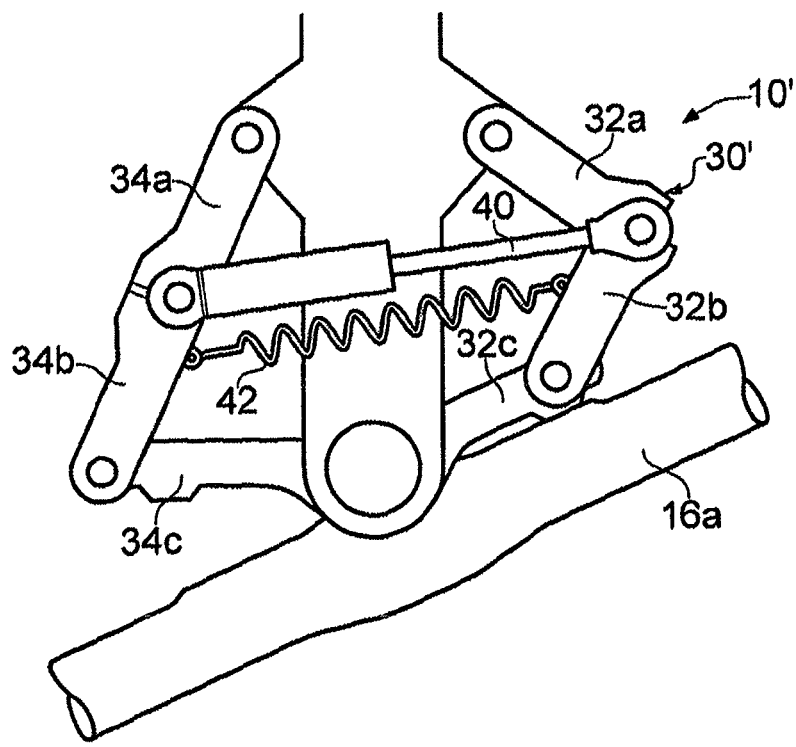

FIGS. 3a and 3b show a partial, plan view of a landing gear 10' according to a preferred embodiment of the present invention. This embodiment is similar to the previous embodiment, but rather than driving each barrier arm 32c, 34c independently by way of an actuator 19a, 19b, the locking device 30' of the illustrated embodiment incorporates the barrier arms 32c, 34c into respective three bar linkages 32a, 32b, 32c and 34a, 34b, 34c.

The first and second bars 32a, 32b of the first, three bar linkage 32a, 32b, 32c are arranged to lock "over-centre". When locked over centre, the first and second bars 32a, 32b lock the barrier arm 32c in the deployed configuration. The locking device 30' is arranged such that the first, three bar linkage 32a, 32b, 32c and bogie beam 14 together define a generally right-angled triangle shape when the first and second bars 32a, 32b lock over centre.

Consequently, the barrier arm 32c is arranged, when in the deployed configuration, to be generally orthogonal with respect to the longitudinal axis of the bogie beam 14. However, the barrier arms 32a, 34c and associated linkage may in other embodiments take other suitable configurations.

The second, three bar linkage 34a, 34b, 34c, which includes the barrier arm 34c, is provided on the opposite side of the bogie beam to the first three bar linkage 32a, 32b, 32c and substantially mirrors its configuration. The bars 32a-c, 34a-c are in this embodiment formed of a rigid material, for example a metal such as steel, a plastics material or a composite material.

The locking device 30' further includes an actuator 40 connected at a first end to the first, three bar linkage 32a, 32b, 32c at a region near the connection between the first bar 32a and second bar 32b. The second end of the actuator 40 is connected to the second, three bar linkage 34a, 34b, 34c at a region near the connection between the first bar 34a and second bar 34b. Consequently, the actuator is operable to move the first and second bars 32a, 32b and 34a, 34b between locked over-centre configurations and non-locked configurations. Such movement brings about corresponding movement of the barrier arms 32c, 34c and thus the arm abutments 24a, 24b.

With the actuator 40 in its shortest configuration, the pairs of bars 32a, 32b, 34a, 34b are locked over-centre, resulting in each of the barrier arms 32c, 34c being locked in the deployed configuration wherein the respective arm abutments 24a, 24b have each taken up a position that inhibits the axle 16a rotating from its orthogonal position. Any external forces applied to the axle 16a which would otherwise cause it to rotate are opposed by one of the axle abutments 16a' and 16a" pressing against a respective arm abutment 24a, 24b. The locking device 30' of the illustrated embodiment has an advantage over the embodiment shown in FIG. 2 in that when the barrier arms 32c, 34c are in the deployed configuration, the over-centre two bar linkages 32a, 32b and 34a, 34b prevent an external force applied to the axle 16a from loading the actuator 40.

By causing the actuator 40 to extend in length, the pairs of bars 32a, 32b, 34a, 34b are forced over-centre, thus withdrawing the arm abutments 32c, 34c from the deployed configuration and in doing so moving the arm abutments 24a, 24b away from the axle abutments 16a', 16a" of the axle 16a, so as to permit the axle to pivot about the bogie beam 14. In this manner the arm abutments 24a, 24b can be moved to the retracted configuration.

When a return to the locked position is required the actuator 40 is commanded to retract, and attempts to pull the links 34a, 34b and 32a, 32b into line. If the axle is orthogonal to the bogie then both sets of links 32 and 34 will move to their deployed position and lock over-centre. If the axle is not orthogonal, i.e. is in a partially steered position, as shown in FIG. 3b, then one barrier arm will move to its deployed position (34c in the case of FIG. 3), but the arm abutment 24b of the other barrier arm 32c will come into contact with the axle abutment 16a" of the axle 16a, leaving links 32a and 32b in a partially folded position. The force of the actuator 40, acting upon the folded links 32a and 32b will provide a force on the barrier arm 32c and on the abutment faces defined by the arm abutment 24b and axle abutment 16a" to bring the axle 16a back to the orthogonal position. The geometry of the linkages are such that the mechanical advantage of the actuator 40 increases as the axle 16a nears the orthogonal position. In this way the locking device 30' may compensate for a reduction in the force attempting to restore the axle 16a to the straight ahead position due to trail, as it nears the orthogonal position.

In the illustrated embodiment, the actuator 40 is supplemented by a mechanical biasing device 42, such as a spring, to bias the locking device 30' towards the deployed configuration. This maintains the linkages in the locked position when the actuator is de-energised. It may also be used to provide a force to return the axle 16a to the orthogonal position in the event of actuator failure. However, in other embodiments the locking device 30' may not include such a biasing means.

Thus, in embodiments of the present invention, the arm abutments 24a, 24b can be moved to intersect, or in some cases always reside in, the general movement plane of the axle abutments 16a', 16a" of axle 16. It is preferred that the arm abutments 24a, 24b remain in, or continue to intersect, the general movement plane of the axle abutments 16a', 16a" throughout a major part of, or all of, their movement between the deployed and retracted configurations, such that the arm abutments 24a, 24b can be used to urge the axle 16a into the desired locking orientation irrespective of its orientation during normal operation. In doing so, the axle 16a is manipulated towards the desired orientation by whichever arm abutment 24a, 24b contacts the axle 16a, at the respective axle abutment 16a', 16a", as the arm abutment moves towards the deployed configuration. The locking device is thus able to urge the axle towards the desired orientation for locking, thereby supplementing any mechanical trail and pneumatic trail effect and correcting any positional inaccuracies from any steering control system. Consequently, the locking device 30 according to embodiments of the present invention, does not suffer from the drawback of potentially failing to lock in the event the axle 16a is incorrectly orientated with respect to the bogie beam when the locking device 30 is activated.

Furthermore, because in some embodiments the arm abutments 24a, 24b are movable at different rates, and in come cases independently from one another, the locking device is able to lock one of the arm abutments 24a, 24b in the deployed configuration whilst the other arm abutment is driving the axle 16a towards the locking orientation, thereby catching the axle and preventing over-swing. The illustrated embodiment, having the third linkages 32c, 34c individually pivotable with respect to the bogie beam 14, can provide this advantage. However, other ways of providing this effect will be apparent to a skilled person.

Whilst the axle 16a and arm abutments 24a, 24b have been described as having movement planes, it will be appreciated that in practical circumstances the true movement path may vary somewhat from the movement plane and as such the terms is used to denote a general movement path. Similarly, whilst the axle abutments have been described as having a general plane, it does not necessarily mean that the surface is planar.

Whilst in the illustrated embodiment, the two-bar over centre linkages 32a, 32b, 34a, 34b are configured to open outwards, i.e. away from the bogie beam 14, in other embodiments the linkages 32a, 32b, 34a, 34b may be configured to open "inwards" i.e. towards one another. It will be appreciated that in such a case the operation of the actuator 40 would be reversed. Also, whilst the links 34a and 32a are shown pivotally connected to the bogie (body) at separate points 38a and 36a respectively, in some embodiments the pivots 36a and 38a may be combined onto a common pin.

The pivot 18 may intersect the axle centreline or it may be displaced from it, in order to provide a mechanical trail.

Whilst the barrier arms 32a, 34c have been described as being pivotally mounted with respect to the bogie beam 14, in other embodiment the locking device may be arranged to move the barrier arms 32a, 34c in a different manner, such as by way of linear movement. In such a case, an abutment arm 24a, 24b would slide across the corresponding axle abutment 16a', 16a" as it urges the axle 16a towards the locking configuration, so the axle abutments 16a', 16a" may be wider to account for this.

The invention claimed is:

1. A landing gear, including an elongate axle pivotally connected to a bogie beam, the landing gear further including a locking device for locking the axle at a substantially fixed orientation with respect to the bogie beam, the locking device including first and second barrier arms that are independently movable between a first configuration, in which they define a barrier so as to maintain the axle in the substantially fixed orientation with respect to the bogie beam, and a second configuration, in which the axle may pivot about the bogie beam.

2. A landing gear according to claim 1, wherein the barrier arms are pivotally mounted with respect to the bogie beam.

3. A landing gear according to claim 2, wherein the axis of rotation of each barrier arm is non-orthogonal with respect to the steering axis of rotation of the axle.

4. A landing gear according to claim 3, wherein the axis of rotation of each barrier arm is generally parallel with respect to the steering axis of rotation of the axle.

5. A landing gear according to claim 1, wherein the barrier arms are provided on opposite sides of a longitudinal axis of the bogie beam.

6. A landing gear according to claim 1, wherein the locking device is arranged to lock the barrier arms in the first configuration.

7. A landing gear according to claim 6, wherein the locking device is arranged such that the one of the barrier arms may be moved to and locked in the first configuration, while the other barrier arm is between the second and first configurations.

8. A landing gear according to claim 1, wherein the locking device includes a first, two-bar over-centre linkage, arranged to move the first barrier arm between the first and second configurations.

9. A landing gear according to claim 8, wherein the locking device includes a second, two-bar over-centre linkage, arranged to move the second barrier arm between the first and second configurations.

10. A landing gear according to claim 9, wherein the locking device includes an actuator connected at a first end to a middle region of the first two-bar over-centre linkage, and at a second end to a middle region of the second two-bar over-centre linkage.

11. A landing gear according to claim 1, wherein the locking device includes a biasing device arranged to bias the barrier arms towards the first configuration.

12. A landing gear according to claim 1, wherein the barrier arms each include an arm abutment arranged to engage a corresponding axle abutment when a respective barrier arm is adjacent the axle.

13. A landing gear according to claim 12, wherein the axle abutments are defined on opposite sides of the axis of rotation of the axle and spaced from one another.

14. A landing gear according to claim 13, wherein the barrier arms are arranged such that the arm abutments move in the plane of movement of the axle abutments.

15. A landing gear according to claim 12, wherein the barrier arms are arranged such that the arm abutments move in the plane of movement of the axle abutments.

16. A landing gear according to claim 15, wherein the locking device is arranged to be operable to urge the axle to a position generally orthogonal to the bogie beam, from an initial position which may be displaced by more than 3°.

17. A landing gear according to claim 12, wherein the locking device is arranged to be operable to urge the axle to a position generally orthogonal to the bogie beam, from an initial position which may be displaced by more than 3°.

18. A landing gear according to claim 1, wherein the barrier arms are spaced further from the axle when in the second configuration, than in the first configuration.

19. A landing gear, including an elongate axle pivotally connected to a bogie beam, the landing gear further including a locking device for locking the axle at a substantially fixed orientation with respect to the bogie beam, the locking device including first and second barrier arms that are movable between a first configuration, in which they define a barrier so as to maintain the axle in the substantially fixed orientation with respect to the bogie beam, and a second configuration, in which the axle may pivot about the bogie beam, wherein the barrier arms are not connected to the axle so as to move therewith.

20. A landing gear, including an elongate axle pivotally connected to a bogie beam, and being pivotally movable so as to define a swept volume, the landing gear further including a locking device for locking the axle at a substantially fixed orientation with respect to the bogie beam, the locking device including first and second barrier arms that are movable between a first configuration, in which they are within the swept volume to define a barrier so as to maintain the axle in the substantially fixed orientation with respect to the bogie beam, and a second configuration, in which the axle may pivot about the bogie beam.

* * * * *